UNITED STATES PATENT OFFICE.

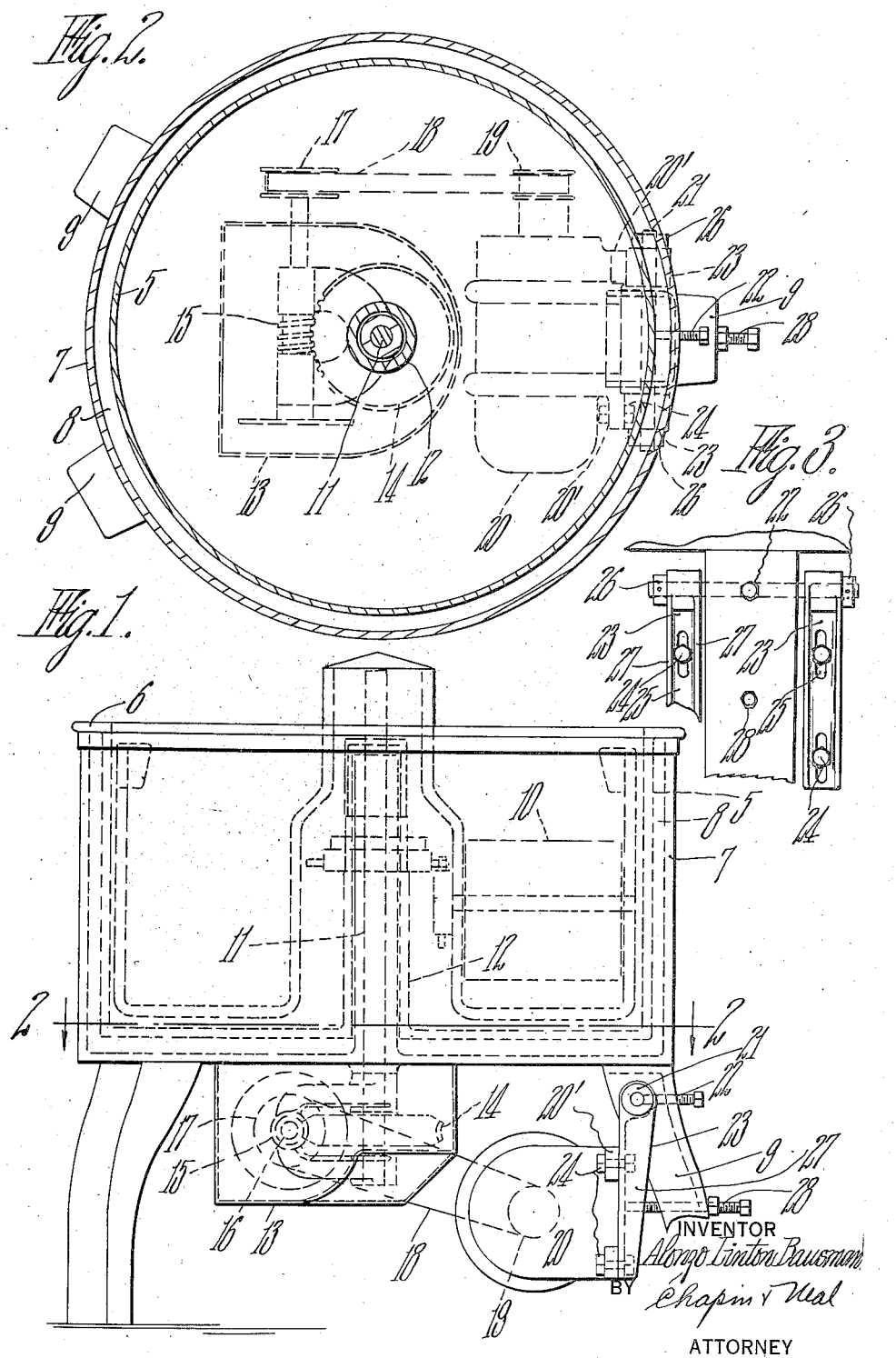

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

MOTOR SUPPORT.

1,427,713.　　　Specification of Letters Patent.　Patented Aug. 29, 1922.

Application filed March 12, 1921. Serial No. 451,933.

*To all whom it may concern:*

Be it known that I, ALONZO LINTON BAUSMAN, citizen of the United States, residing at Springfield, in the county of Hampden and State of Massachusetts, have invented new and useful Improvements in Motor Supports, of which the following is a specification.

This invention relates to improvements in motor supports, such as are adapted for supporting the driving motor of a machine in such a way as to tension the driving belt, or equivalent connection.

One object of the invention is to provide a standardized mounting which is adjustable to fit motors of different sizes and which at the same time provides for the tensioning of the belt connection between the motor and the driven parts of the machine.

Another object of the invention is to provide in a machine, such as a mixing-kettle, a compact and inconspicuous arrangement of driving mechanism including a motor and gear-reduction mechanism with a driving connection therebetween and means for tensioning said connection.

Other objects and advantages will appear in the following description and in the illustrative embodiment of the invention in the accompanying drawings, in which,—

Fig. 1 is an elevational view of a mixing-kettle embodying the invention;

Fig. 2 is a sectional plan view thereof; and

Fig. 3 is a fragmentary elevational view taken at right-angles to Fig. 1.

Referring to these drawings; the invention will be disclosed herein by way of illustrative example in connection with a mixing kettle and the mixing-kettle proper is shown at 5 and consists preferably of a cylindrical vessel having around its open upper end a circular flange 6. Kettle 5 is disposed within a correspondingly-shaped but somewhat larger casing 7 and is supported by the flange 6 resting upon the top of the circular wall of the casing, with its periphery and base spaced from the corresponding parts of the casing to form a jacket 8 for the circulation of a temperature-changing medium. The casing 7 is supported from the floor by a series, as three, of legs 9, which are secured to the base of the casing. A cover (not shown) may be provided to close the open upper end of the kettle.

Within the kettle, there is provided suitable mixing mechanism represented by reference numeral 10 and, for the present purposes, it will suffice to state that all this mechanism is driven by a centrally-disposed vertical shaft 11 which extends downwardly through and below casing 7 for connection to the gear-reduction mechanism. The kettle 5 has a central upstanding tubular portion 12 to receive and house shaft 11.

The gear-reduction mechanism is housed within a casing 13 secured to the base of casing 7 and disposed nearly centrally thereof. Such mechanism includes a worm-gear 14 fixed to shaft 11 and a cooperating worm 15 fixed to a horizontal shaft 16, one end of which extends outside the casing and carries a pulley 17 adapted to be driven by a belt 18 from the pulley 19 of an electric motor 20. The details of the mounting of the parts of the gear-reduction mechanism are not essential to the present invention and need not be described.

The invention is particularly concerned with a mounting for the motor 20 which will admit of adjustment for variations in size and will permit the weight of the motor, or a part thereof, to be utilized for tensioning the belt-connection 18.

To this end, a shaft 21 is mounted horizontally in one of the legs 9, extending entirely through and projecting beyond each side face of the leg. This shaft is made long enough to suit the largest motor likely to be used and is held against endwise movement in its leg 9 by suitable means, such as a set-screw 22. Mounted on this shaft, and arranged one on each side of leg 9, are depending and substantially vertically-disposed arms 23 which support the motor 20. The feet 20' of motor 20 rest against the inner faces of arms 23 and are clamped thereagainst by bolts 24 which pass through vertically-disposed slots 25 in arms 23. The slots 25 admit of adjustment of the bolts 24 to fit the two feet 20' on the same end of the motor, and the adjustment to fit the two feet at opposite ends of the motor is obtained by moving the arms along shaft 21. Preferably, although not necessarily, collars 26 are adjustably secured to shaft 21, one against the outer face of each arm 23 to prevent endwise movement of arms 23 on shaft 21. The arms 23, on their outer faces, preferably are provided with two spaced parallel webs 27, and these webs are desirably so spaced as to closely receive between them the head of bolt 24 and prevent the latter from turning as the nut is turned up.

The arms 23, being free to turn on shaft 21, or being otherwise arranged so that they are free to swing, the weight of motor 20 tends to move the arms in a counterclockwise direction (as viewed in Fig. 1) and thus tightens belt 18. While the entire weight of the motor may be brought into play for the purpose of tensioning belt 18, it is generally unnecessary and even detrimental to do so. Accordingly, means are provided to regulate the tension of belt 18, such means consisting of an adjustable abutment, in the shape of a screw 28 threaded into leg 9, adapted to limit the counterclockwise movement of the arms 23.

For lining up the pulley 19 with pulley 17, the set-screw 22 is loosened and shaft 21 shifted axially in leg 9.

By disposing the motor vertically, it is possible to get the tensioning advantage due to a pivotal mounting and yet have the motor very close to the casing of the gear-reduction mechanism. Particularly, it is possible by this mounting to locate the motor in the small space available, which would not be feasible if the arms 23 were, for example, arranged horizontally. Moreover, by arranging the pivotal support for the motor on one of the legs 9, this leg, which is necessarily broad, serves to conceal a large part of the motor and renders it inconspicuous.

The invention has been disclosed herein, in an embodiment at present preferred, for illustrative purposes, but the scope of the invention is defined by the appended claims rather than by the foregoing description.

What I claim is—

1. In combination, a frame, a driven element mounted therein, a motor, a flexible driving connection between the motor and said element, pivotal supporting means mounted in said frame, arms loosely mounted on said means in spaced relation, and means for rigidly securing the motor to said arms, the latter being movable toward or away from one another on said pivotal supporting means to adapt them to various motors.

2. In combination, a frame, a driven element mounted therein, a motor, a flexible driving connection between the motor and said element, a shaft passing through a portion of said frame and extending beyond opposite sides thereof, arms loosely mounted on said shaft and arranged one on each side of said portion, and openings provided in the motor and in said arms to permit them to be clamped together, said arms being movable toward or away from one another to make the openings in said arms register with those in the motor.

3. In combination, with the driven element of a power driven machine, a series of legs supporting the latter, a shaft passing through and projecting beyond opposite sides of one of said legs, arms loosely mounted at one end on said shaft and arranged one on each side of said leg, a motor bolted to said arms, flexible driving connections between the motor and said element, and adjustable means passing through said leg to abut the motor intermediate said arms and limit its movement in one direction.

4. In combination, with a power-driven machine having a frame supported by a series of legs and a driven element located below the frame and between the center and one side thereof, arms pivotally supported from one of said legs on the opposite side of the frame and depending approximately vertically therefrom, a motor having its base arranged substantially vertically and secured to said arms, and a flexible driving connection between said motor and element.

In testimony whereof I have affixed my signature.

ALONZO LINTON BAUSMAN.